United States Patent [19]

Awakowicz et al.

[11] Patent Number: 4,731,836

[45] Date of Patent: Mar. 15, 1988

[54] TELEPHONE SET FOR TABLE-TOP AND WALL OPERATION

[75] Inventors: Erwin Awakowicz; Erwin Grassl, both of Munich; Peter Kleine, Fischen, all of Fed. Rep. of Germany

[73] Assignee: Siemens Aktiengesellschaft, Berlin & Munich, Fed. Rep. of Germany

[21] Appl. No.: 7,484

[22] Filed: Jan. 28, 1987

[30] Foreign Application Priority Data

Mar. 20, 1986 [DE] Fed. Rep. of Germany ....... 3609513

[51] Int. Cl.⁴ ............................................. H04M 1/02
[52] U.S. Cl. .................................... 379/435; 379/428; 379/446
[58] Field of Search ............... 379/428, 435, 440, 446, 379/447, 450, 454, 455

[56] References Cited

U.S. PATENT DOCUMENTS 4,395,591 7/1983 Kaczkos .............................. 379/435

FOREIGN PATENT DOCUMENTS 2920262 11/1980 Fed. Rep. of Germany .
2920286 8/1981 Fed. Rep. of Germany .
3207824 9/1983 Fed. Rep. of Germany .
166367 12/1980 Japan .................................. 379/454
114054 6/1985 Japan .................................. 379/435
117856 6/1985 Japan .................................. 379/435
160758 8/1985 Japan .................................. 379/435
160759 8/1985 Japan .................................. 379/435
153543 10/1953 Sweden .............................. 379/447
457559 6/1968 Switzerland ....................... 379/447

Primary Examiner—Jin F. Ng
Assistant Examiner—M. Connors
Attorney, Agent, or Firm—Hill, Van Santen, Steadman & Simpson

[57] ABSTRACT

A telephone set is provided including at least one deposit trough for the handset provided in the stationary housing part. A filler member is arranged in the edge region of the deposit trough, this filler member terminating flush with the deposit trough during table-top operation of the telephone set, whereas a nose connected thereto of one piece projects beyond the contours of the deposit trough upon use of the telephone set as a wall unit. The filler member should be securable such that the user himself can refit the telephone set to the two operating positions in a simple way. To this end, a freely accessible cutout into which the filler member can be introduced in two use positions is provided in the edge region of the deposit trough.

5 Claims, 3 Drawing Figures

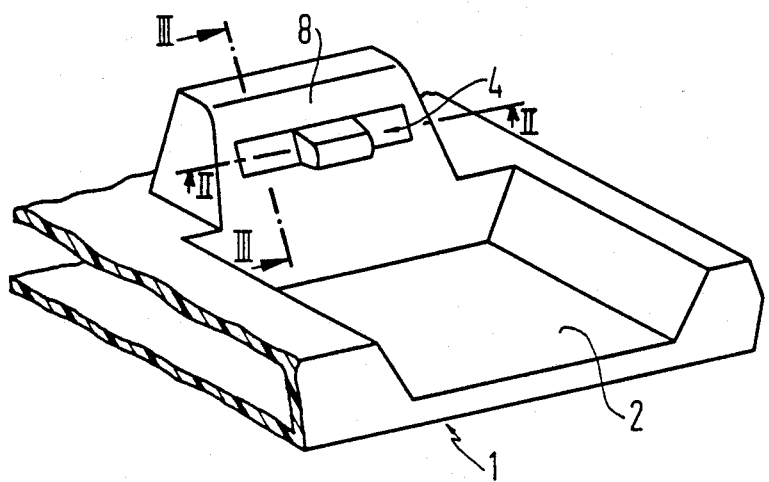
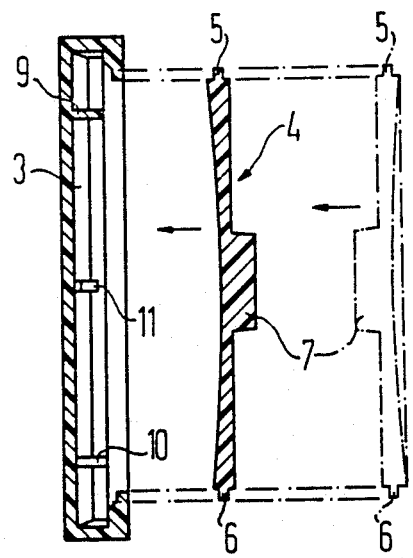
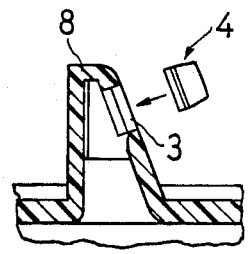

TELEPHONE SET FOR TABLE-TOP AND WALL OPERATION

BACKGROUND OF THE INVENTION

1. Field of the Invention

The present invention comprises a telephone set for table-top and wall operation including at least one deposit trough for a handset provided in a stationary housing part at the outside surface thereof, whereby at least one freely accessible cutout is provided in the edge region of this deposit trough, a filling member being securable in said cutout in two use positions, whereby the filling member terminates flush with the deposit trough given use of the telephone set as table-top device, whereas a nose connected thereto of one piece projects beyond the contours of the deposit trough and engages into a receptacle at the handset given use of the telephone set as a wall unit.

2. Description of the Prior Art

In telephones which are designed to be used both in horizontal as well as in vertical operating position as a table-top as well as a wall unit, a problem for the optimum design of the seating region for the handset on the housing of the stationary device part derives from the different directions in which the force of gravity acts upon the handset when it sets on the base in the two operation positions. The handset should be accepted shock-proof in the cradle of the housing part in each of the two operating positions of the telephone set and, under the influence of the force of gravity, should reliably hold the mechanical actuation element of the cradle switch deflected against its elastic bias. The resting position of the handset on the housing part should be producible in a simple way in both operating positions of the apparatus but, on the other hand, the handset should be capable of being picked up without obstruction in both operating positions of the apparatus.

For example, it is known to provide an apparatus model with one of two differently shaped housing caps dependent on the intended operating position. The difference between the two caps need only relate to the region of the handset depression and can consist, for example, of a rigid collar at the edge of the deposit trough or cradle that projects to a greater or lesser extent.

A housing cap which is the optimum design for wall operation can result in the occurance that when this cap is incorrectly used in a desk set, picking up the handset is significantly more difficult due to the incorrect access direction and could, given a rapid pick-up, lead to the stationary housing part also being pulled up since the stability of the table-top model depends exclusively on the deadweight of the apparatus itself, whereas in the case of the wall model it is governed by the fastening elements that connect the stationary housing part to the wall. The employment of the housing model intended for a table-top unit in a wall telephone, by contrast, can result in an inadequately secure position of the handset in the depression and in an unsatisfactory actuation of the cradle switch. A better solution of the problem is achieved by employing an insert member which is secured in two built-in positions in the region of the deposit trough dependent on the use of the telephone set as a table-top or as a wall unit.

Thus, German OS No. 32 07 824 provides an insert member in the inside of the telephone set which, given table-top use of the telephone set, adapts to the contours of the deposit trough whereas, given wall operation of the telephone set, it has a nose extending through a recess in that edge region of the deposit trough that forms the rest for the handset.

Given this known embodiment, it must be considered disadvantageous, first, that the insert member is screwed to the telephone set, so that a tool in the form of a screwdriver is required for undoing the connection. A further disadvantage is that a change in the built-in position of the insert member respectively requires an additional opening and, after the rebuilding has been carried out, another closing of the telephone set.

This latter disadvantage does not occur given a telephone set as disclosed by U.S. Pat. No. 4,395,591. In this embodiment, a rectangular depression is situated in the region of a deposit trough at the housing part, this rectangular depression serving for the acceptance of the insert member having a nose. However, it must also be deemed disadvantageous in this known arrangement that the insert member is screwed to the telephone set. Strip-shaped or cap-shaped elements are also used in order to cover the screw connection, so that a change in the built-in position of the insert member requires considerable time and assembly outlay.

A telephone set has also been disclosed wherein at least one freely accessible cutout is provided in the region of the deposit trough, the member being capable of being pressed into this cutout in two use positions and being held therein by means of a latch connection.

SUMMARY OF THE INVENTION

An object of the present invention is to provide a further possibility for remodeling the telephone set for two operating positions which can be undertaken at any time by the user himself and in a simple way.

This object is achieved in that the insert member is fashioned as an oblong, resilient, rectangular lamina and includes ends extended step-like which engage behind the end regions of the cutout corresponding thereto in terms of contour in snap fashion, whereby the insert member is seated against walls within the cutout.

This insert member fashioned as a lamina can be manually bent such in its non-integrated condition that it can be quickly and easily snapped into the cutout. The ends of the insert member reduced in steps thereby engage behind the correspondingly fashioned end regions of the rectangular cutout, whereby a secure position of the insert member within the cutout is achieved due to the seating thereof against walls of the cutout.

The insert member can thereby lie against webs and ribs arranged within the cutout, whereby, given introduction of the nose into the cutout (table-top operation), the rib lying opposite the nose is dimensioned such that the insert member terminates flush with the edge region of the deposit trough. In accord with a further development of the invention, the insert member can be slightly bent. As a result of this slight prestress of the insert member, for example in the direction of the nose connected thereto of one piece, the nose is pressed back by the rib opposite the pre-stress of the insert member given table-top operation of the telephone set, i.e. when the nose is introduced into the cutout, that a flush termination of the insert member relative to the cutout is achieved.

BRIEF DESCRIPTION OF THE DRAWINGS

The invention shall be set forth in greater detail below with reference to an exemplary embodiment. Shown are:

FIG. 1 is a partial perspective view of a telephone set employable as a table-top or wall unit.

FIG. 2 is a sectional view of the telephone set taken generally along the section line II—II of FIG. 1.

FIG. 3 is a sectional view of the telephone set taken generally along line III—III of FIG. 1.

DESCRIPTION OF THE PREFERRED EMBODIMENTS

A telephone set 1 shown in the FIGS. has a cutout 3 in the edge region of a deposit trough 2 for the handset (not shown here). This cutout 3 serves for the acceptance of an insert member 4 whereby the telephone set 1 can be optionally employed as table-top unit or as a wall unit.

The insert member 4 is essentially fashioned as a thinwalled, resilient and slightly bent plate-like part whose free ends 5 and 6 are reduced step-like. The insert member has a nose 7 integrally connected to it.

The edge region of the deposit trough 2 is formed by a wedge-shaped projection 8 which projects beyond the deposit trough. The cutout 3 in this edge region is rectangularly fashioned. In its end regions situated in longitudinal direction, the cutout 3 is shaped such that the ends 5 and 6 of the insert member engage behind it. Two webs 9 and 10 as well as a rib 11 are also arranged within the cutout.

Given employment of the telephone set as wall unit, the insert member in the front view shown in FIG. 1 as well as in the solid line illustration in FIG. 2 is introduced into the cutout 3, i.e. the nose 7 projects beyond the edge region of the deposit trough 2. In this operating condition, the nose 7 engages into a corresponding recess in the handset body, for example in the region of the receiver earpiece, so that the handset is prevented from sliding off of the telephone set in an undesired way.

Given employment of the telephone set 1 as table-top unit, the insert member is turned by 180° so that the nose 7 comes to lie within the cutout (broken-line illustration in FIG. 2). The rib 11 is dimensioned such with respect to its length that, due to the seating of the nose 7 thereagainst, the slightly bent insert member is bent back or deflected to such an extent that the insert member 4 terminates flush with the edge region of the deposit trough 2. This ultimate position in table-top operation is shown with dot-dash lines.

The introduction of the insert member into the cutout can be carried out manually, a removal thereof can, for example, be carried out by means of a pointed tool engaging into the edge region of the insert member.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A telephone set for table-top and wall operation including at least one deposit trough for a handset provided in a stationary housing part at the outside surface thereof, whereby at least one freely accessible cutout is provided in the edge region of said deposit trough, an insert member being capable of being secured in said cutout in two use positions, and whereby said insert member terminates flush with said deposit trough when said telephone set is used as a table-top unit, whereas a nose connected to said insert member of one piece projects beyond the contours of said deposit trough when said telephone set is used as a wall unit and engages into a receptacle at said handset, comprising the improvement wherein said insert member is fashioned as an oblong, resilient, rectangular plate-like member and has ends reduced in step-like fashion, said ends engaging behind end regions of said cutout corresponding thereto in terms of contour in snap fashion, whereby said insert member seats against walls within said cutout.

2. A telephone set according to claim 1, wherein said insert member lies against webs and a rib arranged within said cutout, whereby the rib lying opposite said nose when said nose is introduced into said cutout is dimensioned such that said insert member is deflected to terminate flush with the edge region of said deposit trough.

3. A telephone set according to claim 1, wherein said insert member is slightly bent.

4. A telephone set according to claim 1, wherein the edge region of said deposit trough including said cutout is formed by a wedge-shaped projection projecting beyond said deposit trough.

5. A telephopne set for table-top and wall operation including at least one cradle for a handset provided in an outside surface of a stationary housing part, said cradle having at least one freely accessible cutout provided in an edge region thereof, an insert member being securable in said cutout in two use positions, said insert member terminating flush with said cradle when said telephone set is used as a table-top unit and a dose portion of said insert member projecting beyond the contours of said cradle when said telephone set is used as a wall unit to engage into a receptacle in said handset, comprising the improvement wherein said insert member is formed as an oblong, resilient, rectangular plate-like member, being formed slightly bent, said insert member having ends reduced in step-like fashion, said ends engaging behind end regions of said cutout which are formed in a complementary shape, and webs and a rib being arranged within said cutout, said rib being positioned such that it lies opposite said nose when said nose is inserted into said cutout, and being dimensioned such that the insert member is deflected to terminate flush with the edge region of said cradle.

* * * * *